Patented July 31, 1923.

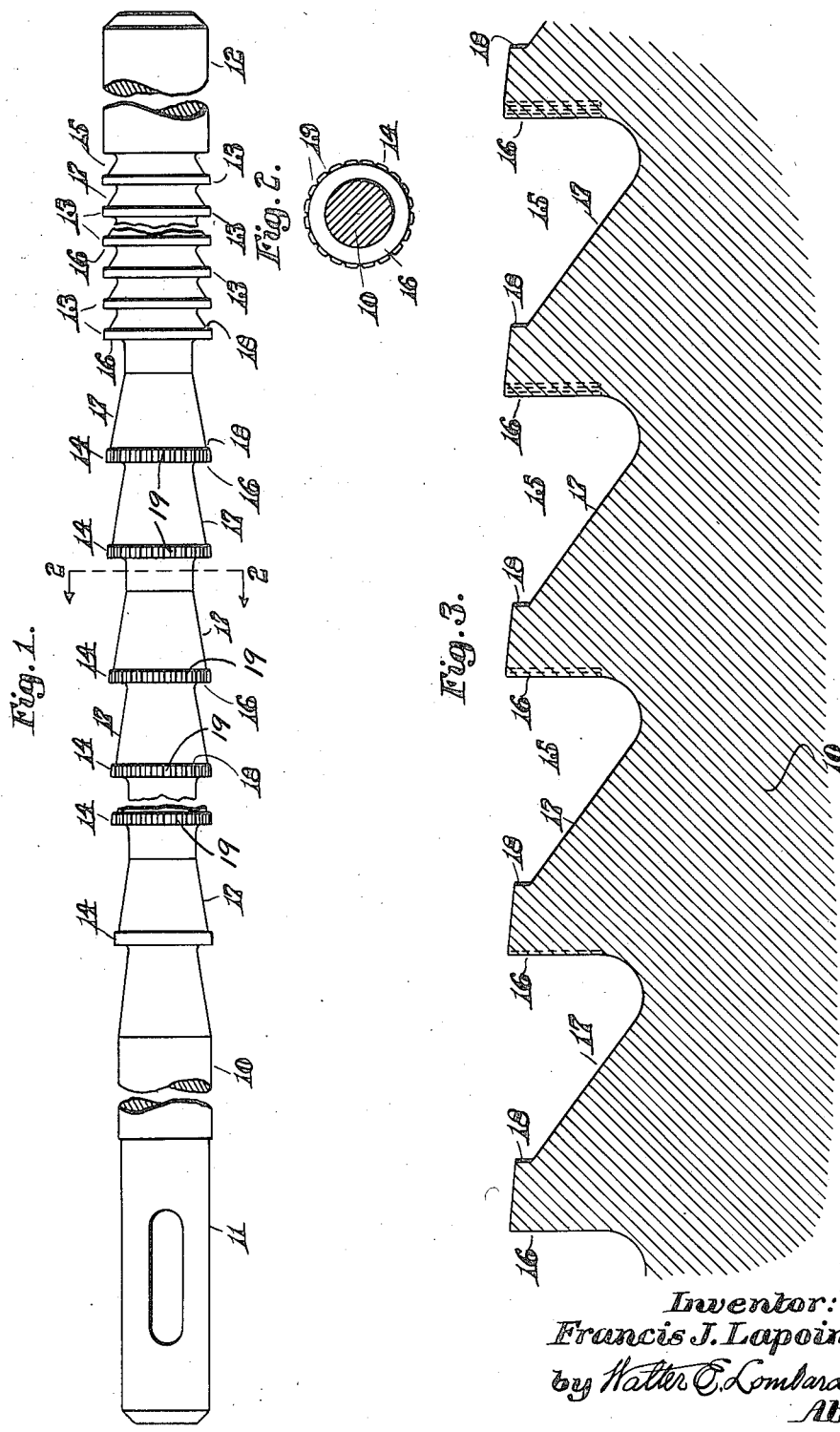

1,463,473

UNITED STATES PATENT OFFICE.

FRANCIS J. LAPOINTE, OF ANN ARBOR, MICHIGAN.

BROACHING TOOL.

Application filed December 2, 1921. Serial No. 519,500.

*To all whom it may concern:*

Be it known that I, FRANCIS J. LAPOINTE, a citizen of the United States of America, and a resident of Ann Arbor, in the county of Washtenaw and State of Michigan, have invented certain new and useful Improvements in Broaching Tools, of which the following is a specification.

This invention relates to broaching tools and particularly to tools of this character designed to cut and finish round holes.

The present invention has for its object the production of a broach so constructed that it may be repeatedly sharpened and yet cut the same diameter of hole.

The invention further consists in forming the tops of the teeth of an equal thickness with the backs thereof connected to the bevel positions of the broach by a slight shoulder the face of which is parallel with the front face of the teeth.

The invention further consists in certain novel features of construction and arrangement of parts which will be understood readily by reference to the description of the drawings and to the claims to be hereinafter given.

For the purposes of illustrating the invention, one preferred form thereof is shown in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings—

Fig. 1 represents an elevation of a broach embodying the principles of the present invention.

Fig. 2 represents a section of same on line 2—2 on Fig. 1, and

Fig. 3 represents a greatly enlarged sectional detail showing the differences in formation of the successive teeth.

Similar characters indicate like parts throughout the several figures of the drawings.

In the drawings, 10 is a member having a cylindrical portion 11 at one end and another cylindrical portion 12 at the opposite end.

The portion 12 is of larger diameter than the portion 11 and is adapted to burnish the hole when the broaching has been completed.

Adjacent to the cylindrical portion 12, the member 10 is provided with a plurality of annular cutting members 13 having the same diameter as the portion 12.

These cutting members 13 are preferably spaced an equal distance apart.

Between these cutting members 13 and the portion 11 are a plurality of cutting members 14 which are spaced from each other a distance considerably greater than the distance between the cutting members 13.

Preferably the space between every alternate pair of cutting members 14 is greater than the space between the other pairs as clearly indicated in the drawings.

Usually in broaches of this character the cutting members 13 and 14 are backed off slightly from the cutting edge, and the member 10 is then provided with a groove 15 to receive the chips cut by the tool.

One wall of this groove 15 forms the front face 16 of the cutting members 13, 14 while the other wall 17 is inclined to the rear edge of the cutting tooth.

Each cutting member 14 has a diameter slightly greater than the cutting member in advance thereof.

In the broaches now in general use the cutting members 13 are backed off or relieved from a hair line of edge so that when the cutting members are sharpened by grinding the front face 16 of each tooth, the diameter of the tooth immediately is slightly reduced so that the required dimension of hole will not be cut.

This is quite objectionable and in the present invention the broach is so constructed that the objection will be entirely overcome.

This is accomplished by nicking the first tooth 13 with its periphery relieved or backed off from its front face 16 while the second tooth is backed off from a point approximately .005″ from said front face 16.

The space between the front face 16 and the point of relief is called the "land" and each succeeding land is preferably of a width approximately .005″ greater than the width of the preceding land so that the last land has a width say of three sixty-fourths of an inch.

The broach cuts in the usual manner and when the first call size cutting member or tooth 13 arrives at the work it will cut the hole to the desired size, and the remaining full size teeth simply follow through the hole which has already been cut.

When the broach becomes dull and requires to be reground, which regrinding is done on the front face 16 of the cutting members 13, the act of grinding will cause the diameter of the first tooth or cutting members to be reduced so that it would be impossible to cut a hole of the desired diameter therewith.

Owing to the second tooth having a wider land if this is reground at the same time the first tooth is reground and to the same amount, the diameter of the second tooth after regrinding will be the same as that of the first tooth before regrinding.

It is obvious therefore, that this regrinding operation may be performed several times without in any manner affecting the size of the hole cut by the broach.

This is a very important advantage as a broach thus constructed may be used much longer than the ordinary broach and much better work may be performed by it than could be performed by the usual construction of broach after it has been in use a short time.

The portion 12 is adapted to burnish the hole cut.

In the construction of the broach the cutting teeth 13, 14 are made with a short rear face parallel with the front face 16 and extending from the periphery of the teeth to the inclined walls 17 of the grooves 15.

This is of considerable advantage as by so constructing the teeth the peripheries thereof will always remain of equal thickness.

Where the peripheries are of equal thickness they can be ground more accurately than would be possible with a broach having the wall 17 of the groove 15 extending to the periphery of the tooth.

When the broaches are straightened in the manufacture thereof it is extremely difficult to straighten them so that they will run true within .005 to .010 of an inch and it is often necessary to grind them running this much out of true.

The consequence is that it is difficult to secure a perfectly round periphery as some parts of the periphery will be wider than other parts and this prevents the grinding wheel from cutting as freely when on a wider portion as it does on a narrow portion of said periphery.

This is particularly true in the manufacture of small broaches.

This is also true when the teeth are backed off in an attempt to secure a uniform land for a cutting edge.

Unless the land is of uniform width an imperfect result will be obtained during the broaching operation due to the fact that if one side of the land is wider than another side it will cut freer on that side and will crowd the broach over to one side with the result that a hole is produced that is not in proper relation to the original hole in the work being operated upon.

By providing the shoulder or rear face 18 these difficulties are entirely obviated and a perfectly round tooth may be ground and when the broach is in use, owing to the uniform width of the periphery of the tooth, a perfectly round hole will be cut in proper relation to the original hole in the work. Moreover the construction of the broach is greatly simplified by making the teeth with the shoulder or face 18.

The teeth 14 are preferably provided with a plurality of peripheral nicks or indentations 19 the nicks in each tooth being out of alinement with the nicks in the teeth adjacent thereto.

It is believed that the operation of the invention and its many advantages will be understood readily without further description.

Having thus described my invention, I claim—

1. A device of the class described, having a plurality of cutting members of uniform size and provided with lands of varying width.

2. A device of the class described, having a plurality of cutting members of uniform size and each of which is provided with a land wider than that on the preceding cutting member.

3. A device of the class described, having a plurality of finishing cutting members of equal diameter provided with lands of varying widths.

4. A device of the class described having a plurality of cutting members of the same diameter having cylindrical peripheries of different widths and front faces perpendicular to said peripheries.

Signed by me at city of Ann Arbor, Michigan, this 29 day of November, 1921.

FRANCIS J. LAPOINTE.

Witnesses:
 DAVID A. DE LONG,
 ROSCOE O. BONISTEEL.